US009752834B2

(12) United States Patent
Schöll et al.

(10) Patent No.: US 9,752,834 B2
(45) Date of Patent: Sep. 5, 2017

(54) REDUNDANT INTEGRATED LIQUID COOLING SYSTEM FOR AVIONICS

(71) Applicant: AIRBUS OPERATIONS GMBH, Hamburg (DE)

(72) Inventors: Robert Schöll, Hamburg (DE); Cherif Terzi, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 917 days.

(21) Appl. No.: 13/852,567

(22) Filed: Mar. 28, 2013

(65) Prior Publication Data

US 2013/0277015 A1    Oct. 24, 2013

Related U.S. Application Data

(60) Provisional application No. 61/617,682, filed on Mar. 30, 2012.

(30) Foreign Application Priority Data

Mar. 30, 2012    (DE) ........................ 10 2012 006 628

(51) Int. Cl.
*B60H 1/00*    (2006.01)
*F28F 1/00*    (2006.01)
(Continued)

(52) U.S. Cl.
CPC ................ *F28F 1/00* (2013.01); *B64D 13/00* (2013.01); *B64D 2013/0614* (2013.01); *B64D 2013/0674* (2013.01)

(58) Field of Classification Search
CPC ... F28F 1/00; B64D 13/00; B64D 2013/0674; B64D 2013/0614
(Continued)

(56) References Cited

U.S. PATENT DOCUMENTS 4,487,034 A * 12/1984 Cronin ................... B64D 13/06
62/172
5,343,692 A    9/1994 Thomson
(Continued)

FOREIGN PATENT DOCUMENTS

DE         695 28 783    7/2003
DE    10 2006 059 418    6/2008
(Continued)

*Primary Examiner* — Len Tran
*Assistant Examiner* — Claire Rojohn, III
(74) *Attorney, Agent, or Firm* — Dickinson Wright (57)    ABSTRACT

A cooling system cools at least one heat producing device provided in a unit of transport, and a method is provided for cooling at least one heat producing device provided in a unit of transport. The cooling system includes at least one first liquid circuit and at least one first heat exchanger assigned to the first liquid circuit, the first liquid circuit, for cooling the at least one first heat producing device, being configured to absorb heat of the first heat producing device via a cooling liquid circulating in the first liquid circuit and dissipate heat to the first heat exchanger, the first heat exchanger being coupled in such a manner to a first air-guiding system available on board the unit of transport, that exhaust air extracted from the first air-guiding system can be supplied to the first heat exchanger in order to recool the cooling liquid.

13 Claims, 6 Drawing Sheets (51) Int. Cl.
  *B64D 13/00*  (2006.01)
  *B64D 13/06*  (2006.01)

(58) Field of Classification Search
  USPC .............................................. 165/104.19, 41
  See application file for complete search history.

(56)   References Cited

U.S. PATENT DOCUMENTS

| | | | |
|---|---|---|---|
| 5,507,150 | A | 4/1996 | Weber |
| 5,701,755 | A | 12/1997 | Severson |
| 6,205,803 | B1 | 3/2001 | Scaringe |
| 7,618,008 | B2 * | 11/2009 | Scherer ................. B64D 13/06 165/58 |
| 2009/0084896 | A1 * | 4/2009 | Boucher ................ B64D 13/08 244/118.5 |
| 2010/0132920 | A1 * | 6/2010 | Casas Noriega ...... B64D 13/00 165/104.11 |
| 2011/0005244 | A1 | 1/2011 | Finney |
| 2012/0000205 | A1 * | 1/2012 | Coffinberry ............ B64D 13/06 60/806 |
| 2012/0175080 | A1 | 7/2012 | Muehthaler |

FOREIGN PATENT DOCUMENTS

| | | |
|---|---|---|
| DE | 10 2009 039 814 | 3/2011 |
| JP | 2002-127994 | 5/2002 |

* cited by examiner

REDUNDANT INTEGRATED LIQUID COOLING SYSTEM FOR AVIONICS

CROSS REFERENCE TO RELATED APPLICATIONS

This application is entitled to and claims the benefit of German Application No. DE 10 2012 006 628.7 filed Mar. 30, 2012 and U.S. Provisional Application No. 61/617,682, filed Mar. 30, 2012, the disclosures of each of which, including the specification, claims, drawings and abstract, are incorporated herein by reference in their entirety.

FIELD

The present invention relates to a cooling system for cooling at least one heat producing device provided in a means of transport, for example in an aircraft, to the use of such a cooling system in a means of transport, for example in an aircraft, to a means of transport, for example an aircraft, having such a cooling system, and to an associated method for cooling at least one heat producing device provided in a means of transport, for example in an aircraft.

BACKGROUND

In means of transport, such as aircraft, buses, trains or ships, more and more electronic components, electronic assemblies and electronic equipment, which may be grouped together under the term electronics for short, are being employed. Electronics on board these means of transport are able to still further increase not only the comfort of the passengers, but also the safety on board. In operation, any form of electronics produces heat (often also referred to as waste heat) and must therefore be cooled. With regard to aircraft, electronics are often referred to as avionics (formed from the terms aviatics (aviation) and electronics).

For many decades, avionics have been grouped together in dedicated compartments (these compartments are often also referred to as avionics compartments) and cooled there with the aid of a ventilation system. In almost all larger commercial aircraft, air cooling systems which use uncooled air as the cooling medium are employed. These cooling systems, also referred to as ventilation systems, are very robust and of comparatively low mass.

Alternatively, it has been envisaged to employ a liquid cooling system for power electronics, which directly cools against the outside temperature level without a compression refrigerating machine, in contrast to galley cooling systems (for example for preserving food). This liquid cooling system is installed centrally in the middle of the aircraft in the vicinity of the ram air ducts and utilises these ram air ducts which are present.

The growing integration of information technology and other electronics results in ever-increasing thermal output densities and thereby makes increasing demands on the cooling ability of the cooling system used. A simple enlargement of the above-mentioned ventilation systems results in increased space requirement, increased mass, greater noise generation, and increased electric power consumption. The ram air ducts required for the above-described liquid cooling system are not present in the vicinity of the avionics compartment and can thus be integrated only with considerable additional outlay on manufacture together with increased structural mass.

IDE 10 2009 039 814 A1 relates to a system and method for cooling at least one heat producing device in an aircraft. The system has at least one cooling circuit. A coolant absorbs heat of the heat producing device and dissipates heat, by way of a heat dissipation device, to the surroundings of the aircraft. A temperature spreading device reduces the temperature of the coolant in a feed flow of the coolant circuit and increases the heat dissipation temperature of the heat dissipation device relative to the temperature of the coolant in an outflow of the coolant circuit.

SUMMARY

It is an object of the present invention to provide a compact, simple and nevertheless efficient cooling system for a means of transport, for example for an aircraft, the use of such a cooling system in a means of transport, for example in an aircraft, a means of transport, for example an aircraft, having such a cooling system, and an associated method for cooling.

This object is achieved by a cooling system according to attached claims, the use of the cooling system according to attached claims, a means of transport according to attached claims and a method according to attached claims. Particular embodiments emerge from each of the dependent claims.

According to a first aspect, a cooling system for cooling at least one first heat producing device provided in a means of transport, for example in an aircraft, is proposed. The cooling system comprises at least one first liquid circuit and at least one first heat exchanger assigned to the first liquid circuit. For cooling the at least one first heat producing device provided on board the means of transport, the first liquid circuit is configured to absorb heat of the first heat producing device by means of a cooling liquid circulating in the first liquid circuit and dissipate heat to the first heat exchanger. The first heat exchanger is coupled in such a manner to a first air-guiding system available on board the means of transport that exhaust air extracted from the first air-guiding system is suppliable to the first heat exchanger in order to recool the cooling liquid.

The first air-guiding system may be, for example, a first exhaust air system present on board the means of transport. Furthermore, the air-guiding system may be a first ventilation system present on board the means of transport, such as a first cabin ventilation system, which provides air, e.g. cabin fresh air, for ventilation purposes.

The liquid-based cooling system enables a more compact design and simplified integration (e.g. on account of smaller pipe cross-sections), compared with air-based cooling systems, and at the same time a high heat transferability.

The at least one first heat exchanger may be arranged, for example, in the first liquid circuit. The at least one first heat producing device may be arranged at any desired location on board the means of transport, for example on board the aircraft. The heat producing device may be any electronic component or electronic equipment usable on board the means of transport. Examples of heat producing devices which may be mentioned here, purely by way of example and non-exhaustively, are apart from computers also power electronics, hydraulic or electrical actuators and pumps, compression refrigerating machines or electric fans. With regard to aircraft, the heat producing device may be, for example, an avionics component or avionics equipment, such as an avionics computer. Furthermore, the heat producing device may be an electronic arrangement grouped together in a dedicated compartment on board the means of transport, such as on board the aircraft. Purely by way of example, it may be mentioned here that equipment situated on the respectively other side of the pressurised fuselage of an aircraft may also be cooled with the air system. Furthermore, not only equipment situated inside the fuselage of an aircraft (pressurised region) can be cooled with the air system, but also equipment situated outside the fuselage of the aircraft (unpressurised region), such as e.g. hydraulic pumps.

The first heat exchanger may be coupled in such a manner to a first air-guiding system situated on board the means of transport, such as a first exhaust air system, that the exhaust air extracted from the first air-guiding system, such as the first exhaust air system, can be supplied to the first heat exchanger in order to support the first heat exchanger in the recooling of the cooling liquid. The first heat exchanger may be directly or indirectly coupled to the first air-guiding system, such as the first exhaust air system. The first exhaust air system may be any conceivable exhaust air system present on board a means of transport, such as an aircraft. For example, the first exhaust air system may be a ventilation system for avionics equipment which is not liquid-cooled, a ventilation system for electrical power distribution centres or a cabin exhaust air or cabin ventilation system. The above list for exhaust air systems is to be understood as being purely by way of example and non-exhaustive.

The cooling system may further have at least one second liquid circuit and at least one second heat exchanger assigned to the second liquid circuit. The at least one second heat exchanger may be arranged, for example, in the second liquid circuit. For cooling at least one second heat producing device provided on board the means of transport, the second liquid circuit is configured to absorb heat of the second heat producing device by means of a cooling liquid circulating in the second liquid circuit and dissipate heat to the second heat exchanger. The second heat exchanger may be coupled, for example directly or indirectly, in such a manner to a second air-guiding system available on board the means of transport, for example a second exhaust air system available on board the means of transport, that exhaust air extracted from the second air-guiding system, for example the second exhaust air system, is suppliable (can be supplied) to the second heat exchanger in order to recool the cooling liquid.

In the following, without being limited thereto, in the description of the cooling system the first air-guiding system is referred to as the first exhaust air system and the second air-guiding system is referred to as the second exhaust air system.

The first and the second liquid circuit (often also referred to as cooling circuit for short) may be of the same kind or different. Both liquid circuits may be formed as closed circuits. The cooling liquid circulating in the first and/or the second liquid circuit may be any cooling liquid (often also referred to as liquid cooling medium) which is suitable for cooling electronics and can cool the electronics by direct or indirect contact with the electronics. For example, propylene glycol water (PGW) may be used as the cooling liquid. Furthermore, the first and the second heat exchanger may be of the same kind or different. The first and/or the second heat exchanger may be formed e.g. as air-to-liquid heat exchangers. For example, the first and/or the second heat exchanger may be formed as air-to-liquid heat exchangers in such a manner that the cooling liquid, such as PGW, can be retooled by means of the supplied exhaust air originating from the first and/or second exhaust air system. The cooling liquid can absorb the heat of the respective heat producing device and dissipate the heat to the associated heat exchanger.

It is conceivable to couple the first and the second heat exchanger to the same exhaust air system. Alternatively, it is conceivable to couple the first and the second heat exchanger not to the same exhaust air system, but to exhaust air systems of the same kind, for example each having a ventilation system for avionics which are not liquid-cooled, i.e. the first and the second exhaust air system may be exhaust air systems of the same type. As a further alternative, it is conceivable to couple the first and the second heat exchanger each to an exhaust air system of a different type, i.e. the first and the second exhaust air system may be exhaust air systems of a different kind.

The at least one first and the at least one second liquid circuit may each be configured to cool the at least one first heat producing device and/or to cool the at least one second heat producing device. According to a first possible configuration, it is conceivable that only the first liquid circuit serves to cool the at least one first heat producing device and only the second liquid circuit serves to cool the at least one second heat producing device.

According to a second possible configuration, it is conceivable that at least one of the at least one first liquid circuit serves to cool at least one of the at least one first heat producing device and at least one of the at least one first liquid circuit serves to cool at least one of the at least one second heat producing device. In accordance with the second possible configuration, at least one of the at least one second liquid circuit may serve to cool at least one of the at least one first heat producing device and at least one of the at least one second liquid circuit may serve to cool at least one of the at least one second heat producing device. For example, the cooling system according to the second configuration may have two or more first liquid circuits and two or more second liquid circuits. At least one of the two or more first liquid circuits may be configured to cool at least one of the first heat producing devices, while at least one other of the two or more first liquid circuits may be configured to cool at least one of the second heat producing devices. At least one of the two or more second liquid circuits may be configured to cool at least one of the second heat producing devices, while at least one other of the two or more second liquid circuits may be configured to cool at least one of the first heat producing devices.

Various architectures are conceivable for how the various components of the cooling system, e.g. the first and second liquid circuit and the first and second heat exchanger, are arranged and oriented on board the means of transport. The various components of the cooling system may be arranged at least partially spatially separated from one another, i.e. it is conceivable for one part of the components to be arranged in a first region (section) of the means of transport and another part of the components to be arranged in a second region (section) different, e.g. spatially separated, from the first region. For example, the various components of the cooling system may be arranged on different sides of a centre plane running through the longitudinal axis of the means of transport or a centre plane containing the longitudinal axis of the means of transport. The centre plane in this case is situated perpendicularly to the horizontal and divides the means of transport into two e.g. at least almost equal-size halves.

The at least one first heat exchanger may be arranged in the first region, such as a first half, of the means of transport and/or the at least one second heat exchanger may be arranged in the second region separated from the first region, such as a second half, of the means of transport.

According to a first possible embodiment, at least one of the at least one first liquid circuit, for cooling at least one of the at least one first heat producing device, may extend at least partially in the first region. Additionally or alternatively to this, at least one of the at least one second liquid circuit, for cooling at least one of the at least one second heat producing device, may extend at least partially in the second region.

According to a first variant of the first possible embodiment, at least one of the at least one first liquid circuit, for cooling at least one of the at least one second heat producing device, may extend at least partially in the second region. Additionally or alternatively to this, at least one of the at least one second liquid circuit, for cooling at least one of the at least one first heat producing device, may extend at least partially in the first region.

According to a second variant of the first possible embodiment, which may be implemented independently of or in combination with the first variant of the first possible embodiment, at least one of the at least one first liquid circuit, for cooling all of the at least one first heat producing device, may extend at least partially in the first region. Additionally or alternatively to this, at least one of the at least one second liquid circuit, for cooling all of the at least one second heat producing device, may extend at least partially in the second region.

For example, it is conceivable that at least one of the at least one first liquid circuit, for cooling at least one of the at least one first heat producing device, extends at least partially in the first region and, for cooling at least one of the at least one second heat producing device, extends at least partially in the second region. Additionally or alternatively to this, it is conceivable that at least one of the at least one second liquid circuit, for cooling at least one of the at least one first heat producing device, extends at least partially in the first region and, for cooling at least one of the at least one second heat producing device, extends at least partially in the second region.

The first region may comprise a first side of a centre plane running through the longitudinal axis of the means of transport, and/or the second region may comprise a second side of the centre plane running through the longitudinal axis of the means of transport. For example, it is possible that the first region corresponds to the first side of the centre plane running through the longitudinal axis of the means of transport and/or the second region corresponds to the second side of the centre plane running through the longitudinal axis of the means of transport.

In the following, without being limited thereto, it is assumed that the first region is a first side, such as the right side (the right half), of the centre plane (seen in the direction of travel or direction of flight of the means of transport) and the second region is a second side, such as the left side (the left half), of the centre plane.

According to a first possible architecture, at least one of the at least one first liquid circuit, for cooling at least one of the at least one first heat producing device, may extend at least partially, e.g. also fully, on the first side and/or at least one of the at least one second liquid circuit, for cooling at least one of the at least one second heat producing device, may extend at least partially, e.g. also fully, on the second side.

Additionally or alternatively to the first possible architecture, according to a second possible architecture, at least one of the at least one first liquid circuit, for cooling at least one of the at least one second heat producing device, may extend at least partially on the second side and/or at least one of the at least one second liquid circuit, for cooling at least one of the at least one first heat producing device, may extend at least partially on the first side. In accordance with the second possible architecture, one of two or more liquid circuits, arranged on the right side of the centre plane, for cooling a heat producing device arranged on the right side, may be arranged at least partially, e.g. also fully, on the right side and one other of two or more liquid circuits, arranged on the right side of the centre plane, for cooling a heat producing device arranged on the left side, may extend from the right side to the left side. Analogously, one of two or more liquid circuits, arranged on the left side of the centre plane, for cooling a heat producing device arranged on the left side, may be arranged at least partially, e.g. also fully, on the left side and one other of two or more liquid circuits, arranged on the left side of the centre plane, for cooling a heat producing device arranged on the right side, may extend from the left side to the right side.

As a conceivable variant of the first and second possible architecture, at least one of the at least one first liquid circuit, for cooling all of the at least one first heat producing device (e.g. of the two or more first heat producing devices), may extend at least partially, e.g. also fully, on the first side and/or at least one of the at least one second liquid circuit, for cooling all of the at least one second heat producing device (e.g. of the two or more second heat producing devices), may extend at least partially, e.g. also fully, on the second side.

As a third possible architecture, which may be implemented both independently of and in combination with the first and/or the second possible architecture, at least one of the at least one first liquid circuit, for cooling at least one of the at least one first heat producing device, may extend at least partially on the first side and the same at least one first liquid circuit, for cooling at least one of the at least one second heat producing device, may extend at least partially on the second side. Additionally or alternatively, according to the third architecture, at least one of the at least one second liquid circuit, for cooling at least one of the at least one first heat producing device, may extend at least partially on the first side and the same at least one second liquid circuit, for cooling at least one of the at least one second heat producing device, may extend at least partially on the second side.

According to a first possible implementation of the cooling system, which may be employed in any of the above-described architectures, the cooling system may further have one or more fans. The one or more fans may each be arranged in such a manner in the cooling system and so configured as to extract the exhaust air from the first and/or the second exhaust air system. For example, a first fan may be provided which is configured to extract exhaust air from the first exhaust air system. Additionally or alternatively, a second fan may be provided which is configured to extract exhaust air from the second exhaust air system. According to this possible implementation, the cooling system may furthermore have one or more pipe arrangements which are each configured to supply the extracted exhaust air to the first and/or the second heat exchanger in order to recool the cooling liquid. For example, a first pipe arrangement may be provided which can guide or lead the exhaust air extracted from the first exhaust air system to the or into the first heat exchanger. Additionally or alternatively, a second pipe arrangement may be provided which is configured to guide or lead the exhaust air extracted from the second exhaust air system to the or into the second heat exchanger. Alternatives are conceivable for the generation/extraction of the air flow (the exhaust air) with the aid of the fan(s). For example, the exhaust air flow(s) may also be generated without fans. For example, it is conceivable that in the case of an aircraft the pressure drop from the aircraft interior to the outside may be utilised to generate the first and/or second exhaust air flow. Depending on the particular operating situation, this alternative configuration offers the same functionality as with the presence of the fan(s) without further outlay on equipment. For example, the cooling system may have one or more pressure regulating valves which are arranged, for example, in the outer skin of an aircraft in order to transport cabin exhaust air to the outside. This cabin exhaust air flow can be supplied at least partially to the first and/or the second heat exchanger.

According to a second possible implementation of the cooling system, which may be employed independently of or in combination with the first possible implementation, the cooling system may be so configured that outside air surrounding the means of transport (as a first variant of the second possible implementation) and/or inside air present inside the means of transport and surrounding the cooling system (as the second variant of the second possible implementation) is suppliable to the first and/or the second heat exchanger in order to cool the cooling liquid. As a result, the cooling capacity of the system can be still further increased under, for example, particularly hot ambient conditions. The first and second variant of the second possible implementation may be implemented independently of or combined with one another. For example, the first or second variant may be chosen, depending on the particular operating state. Accordingly, depending on the operating state, an admixture of cooler air from the inside of the means of transport, such as e.g. from the direct environment of the cooling system, may be expedient. In order to guide the outside air and/or inside air separately from the extracted exhaust air, the exhaust air extracted from the first and/or the second exhaust air system can be guided past the first and/or second heat exchanger via one or more bypass arrangements. For example, a first bypass arrangement may be provided which is configured to guide the exhaust air extracted from the first exhaust air system past the first heat exchanger. Additionally or alternatively to this, a second bypass arrangement may be provided which is configured to guide the exhaust air extracted from the second exhaust air system past the second heat exchanger.

Depending on the operating state, the means of transport, e.g. the aircraft, may be markedly hotter or cooler inside than outside. For example, if an aircraft is standing on the ground on a particular hot day, the cabin temperature with the air conditioning system switched off may lie 30° C. above the ambient temperature. After switching on the air conditioning system, this relationship almost reverses. Accordingly, in a first operating state in which the cabin temperature lies above the ambient temperature, outside air may be employed for cooling. If after the cooling of the cabin interior by the air conditioning system this relationship reverses, i.e. in a second operating state the inside temperature is now lower than the ambient temperature, the inside air may be admixed with the outside air, or only the inside air employed, in order to cool the cooling liquid.

According to the second possible implementation, the cooling system may have a valve arrangement which is configured to isolate the supplied outside air and/or inside air from the exhaust air guided via the bypass arrangement. For example, the exhaust air guided via the one or more bypass arrangements, e.g. the exhaust air of the first and/or the exhaust air of the second exhaust air system, may be guided in a manner isolated from the outside air with the aid of the valve arrangement. Furthermore, a skin valve arranged at the outer skin of the means of transport, such as at the outer skin of the aircraft, may be provided to selectively let outside air into the inside of the means of transport or keep it out of (keep it away from) the latter. When the skin valve is opened, the outside air can be guided via a pipe arrangement to the corresponding heat exchanger(s). In order to prevent the supplied outside air from mixing with the exhaust air from the exhaust air system(s), there may be provided downstream (in the sense of the flow direction of the exhaust air from the exhaust air system to the heat exchanger) a valve which selectively can let the exhaust air through to the heat exchanger or, if the outside air is guided to the heat exchanger, can prevent entry of the exhaust air into the pipe arrangement guiding the outside air. As part of the valve arrangement, a valve may be provided on the bypass arrangement which selectively can be opened (if the outside air is to be admitted to the heat exchanger), in order to guide the exhaust air from the exhaust air system via the bypass arrangement past the heat exchanger, or can be closed (if the exhaust air is to be admitted to the heat exchanger), in order to prevent entry of the exhaust air into the bypass arrangement. Instead of the said valves, it is also possible to employ, for example, a three-way valve at least as part of the valve arrangement. Additionally or alternatively to the valve arrangement, the cooling system may have a pipe stop arrangement for achieving the same functionality.

The cooling system may further have one or more thermoelectric cooling elements. The thermoelectric cooling elements may each be arranged in such a manner in the first and/or in the second liquid circuit and so configured that the one or more thermoelectric cooling elements absorb heat from the cooling liquid in the inflow of the first and/or of the second liquid circuit and dissipate heat to the cooling liquid in the outflow of the first and/or second liquid circuit. For example, a first thermoelectric cooling element may be arranged in the first liquid circuit. Additionally or alternatively, a second thermoelectric cooling element may be arranged in the second liquid circuit. However, alternatives to the said thermoelectric cooling elements are also conceivable. Suitable alternatives are all devices which are capable of transporting heat from a low temperature level to a higher level, for example a compression refrigerating machine. In this regard, reference is made to the application DE 10 2009 039 814 A1 of the applicant, which describes similar applications in general, and the content of which is hereby incorporated in this application. In one possible embodiment, the expected thermodynamic properties (e.g. temperature level, small difference in temperature between feed flow and outflow, and the heat flow quantity to be transported) show the use of thermoelectric cooling elements to be suitable.

According to a second aspect, the use of the cooling system, as the system has been/is described herein, for cooling at least one first heat producing device provided in a means of transport, for example in an aircraft, is proposed.

According to a third aspect, a means of transport, for example an aircraft, having the cooling system, as it has been/is described herein, is proposed.

According to a fourth aspect, a method for cooling at least one first heat producing device provided in a means of transport, for example in an aircraft, is proposed. The method comprises the steps: cooling the at least one first heat producing device provided on board the means of transport by absorbing heat of the first heat producing device by means of a cooling liquid circulating in a first liquid circuit and dissipating heat from the cooling liquid to a first heat exchanger assigned to the first liquid circuit; extracting exhaust air from a first air-guiding system available on board the means of transport, for example a first exhaust air system available on board the means of transport; and supplying the extracted exhaust air to the first heat exchanger in order to retool the cooling liquid.

Even if some of the above-described aspects have been described with regard to the cooling system, these aspects may also be implemented for the use of the cooling system or as a method. In the same way, aspects described with regard to a/the method may also be implemented by suitable units in the cooling system.

BRIEF DESCRIPTION OF THE DRAWINGS

Preferred embodiments of the present invention are explained below with reference to the appended schematic figures, in which.

DETAILED DESCRIPTION

In the following, without being limited thereto, specific details are set out in order to provide a complete understanding of the present invention. However, it is clear to a person skilled in the art that the present invention may be used in other embodiments which may differ from the details set out below.

FIGS. 1 to 6 are described below, purely by way of example, with reference to an aircraft as the means of transport. Accordingly, the electronic components are mostly referred to as avionics. However, the embodiments are not limited thereto, but may also be employed in other means of transport, such as in buses, trains or ships. Accordingly, the cooling systems described below may also be used for cooling components or equipment other than avionics. Examples of heat producing devices which may be mentioned here, purely by way of example and non-exhaustively, are apart from computers also power electronics, hydraulic or electrical actuators and pumps, compression refrigerating machines or electric fans.

Figure 1:
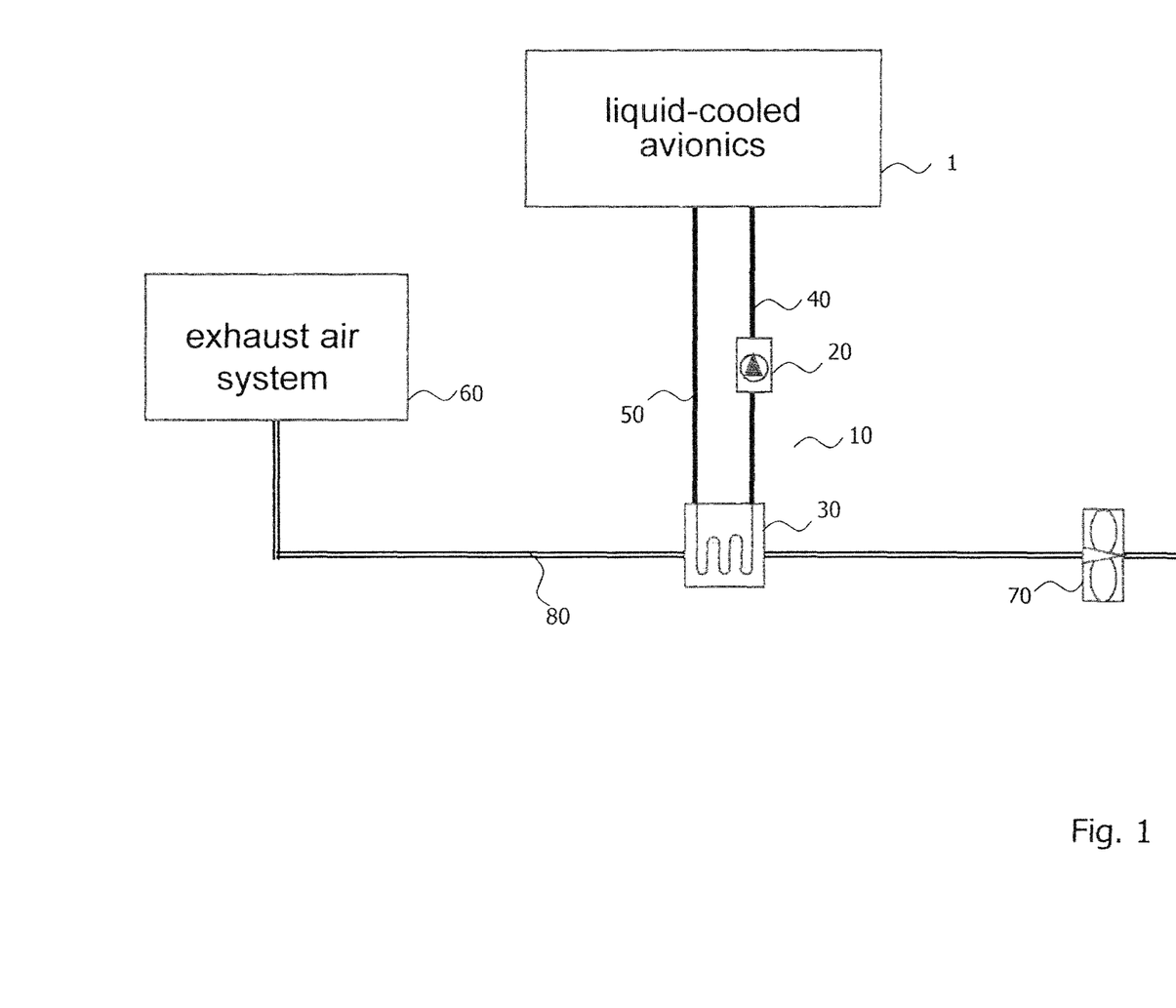
FIG. 1 shows a schematic illustration of a cooling system according to a first embodiment of the present invention with one liquid circuit.

In FIG. 1, a cooling system according to a first embodiment is illustrated schematically, this system serving to cool avionics 1 present in an aircraft. For this purpose, the cooling system has a liquid circuit 10, in which a liquid cooling medium (referred to below in some cases also as cooling liquid) circulates. Purely by way of example, without being limited thereto, in this and the further embodiments described, propylene glycol water (PGW) is used as the liquid cooling medium. However, instead of PGW, alternatively any other suitable liquid cooling medium may be used. The liquid circuit 10 has an inflow (e.g. a pipeline inflow) 40 and a return flow (also referred to as an outflow, e.g. a pipeline outflow) 50. The avionics 1 are supplied with the cooling liquid (the liquid cooling medium) via a pump 20 arranged in the liquid circuit 10. The arrangement, shown in FIG. 1 (and the further FIGS. 2 to 6), of the pump 20 in the cooling circuit(s) is to be understood as being purely by way of example and may be freely chosen. Furthermore, the arrangement of the pump 20 in the cooling circuit(s) may be optimised from the mechanical and thermodynamic points of view.

In this and the further embodiments, the liquid circuit 10 is formed in each case as a closed circuit. The liquid circuit 10 serves to absorb heat from the avionics 1 with the aid of the cooling liquid and dissipate heat in a heat exchanger 30 assigned to the liquid circuit 10. As can be seen in FIG. 1, the heat exchanger 30 is arranged in the liquid circuit 10. The liquid circuit can absorb, for example, the heat from the avionics 1 when it flows around the avionics 1 and comes directly or indirectly into contact the latter.

The first heat exchanger 30 is coupled to a first exhaust air system 60 with the aid of a pipe arrangement 80, as can be seen in FIG. 1, so that in the coupled state the cooling system according to the first embodiment is formed. Furthermore, a fan 70 can be seen in FIG. 1. In the cooling system according to the first embodiment, the pipe arrangement 80 is directly coupled to the exhaust air system 60 present in the aircraft, so that the fan 70 can extract exhaust air from the exhaust air system 60 via the pipe arrangement 80. The extracted exhaust air can then be supplied to the heat exchanger 30 or guided through the heat exchanger 30. Irrespective of how the exhaust air comes into contact with the heat exchanger 30, the exhaust air serves to recool the cooling liquid in the heat exchanger 30 or support the heat exchanger 30 in the recooling of the cooling liquid. The exhaust air system 60 may be any type of exhaust air systems present on board an aircraft. Available sources are, inter alia, the ventilation system for avionics equipment which is not liquid-cooled, ventilation systems of the electrical power distribution centres or cabin exhaust air ventilation systems. The heat exchanger 30 can be coupled to these exhaust air systems mentioned by way of example and other exhaust air systems. The fan 70 sucks exhaust air out of the exhaust air system 60, which exhaust air is then supplied via the pipe arrangement 80 to the heat exchanger 30, for example is sucked through the heat exchanger 30. The use of inevitably arising exhaust air, i.e. exhaust air which is present anyway, for recooling the cooling liquid in the heat exchanger 30 results in a simplified construction. The air flow of the exhaust air is available "for nothing as it were" and does not have to be provided with further outlay on equipment. This reduces the complexity of the construction, the mass of the cooling system and the energy required for cooling, and simplifies maintenance. Moreover, the quality requirements of the exhaust air may be low, since it only comes into contact with the heat exchanger 30, but not directly with the avionics 10 (the electronic components of the avionics 10).

The cooling system shown in FIG. 1 may comprise further components (not illustrated), such as an accumulator to compensate for leaks and to regulate pressure under variable temperatures and/or a particular filter and/or sensors for monitoring the correct functioning. The sensors may, for example, be interrogated by an arithmetic unit or continuously transmit system parameters to an arithmetic unit, on the basis of which it can be established whether the cooling system is functioning correctly. If necessary, a dual-pump package may also be employed to increase the availability.

Figure 2:
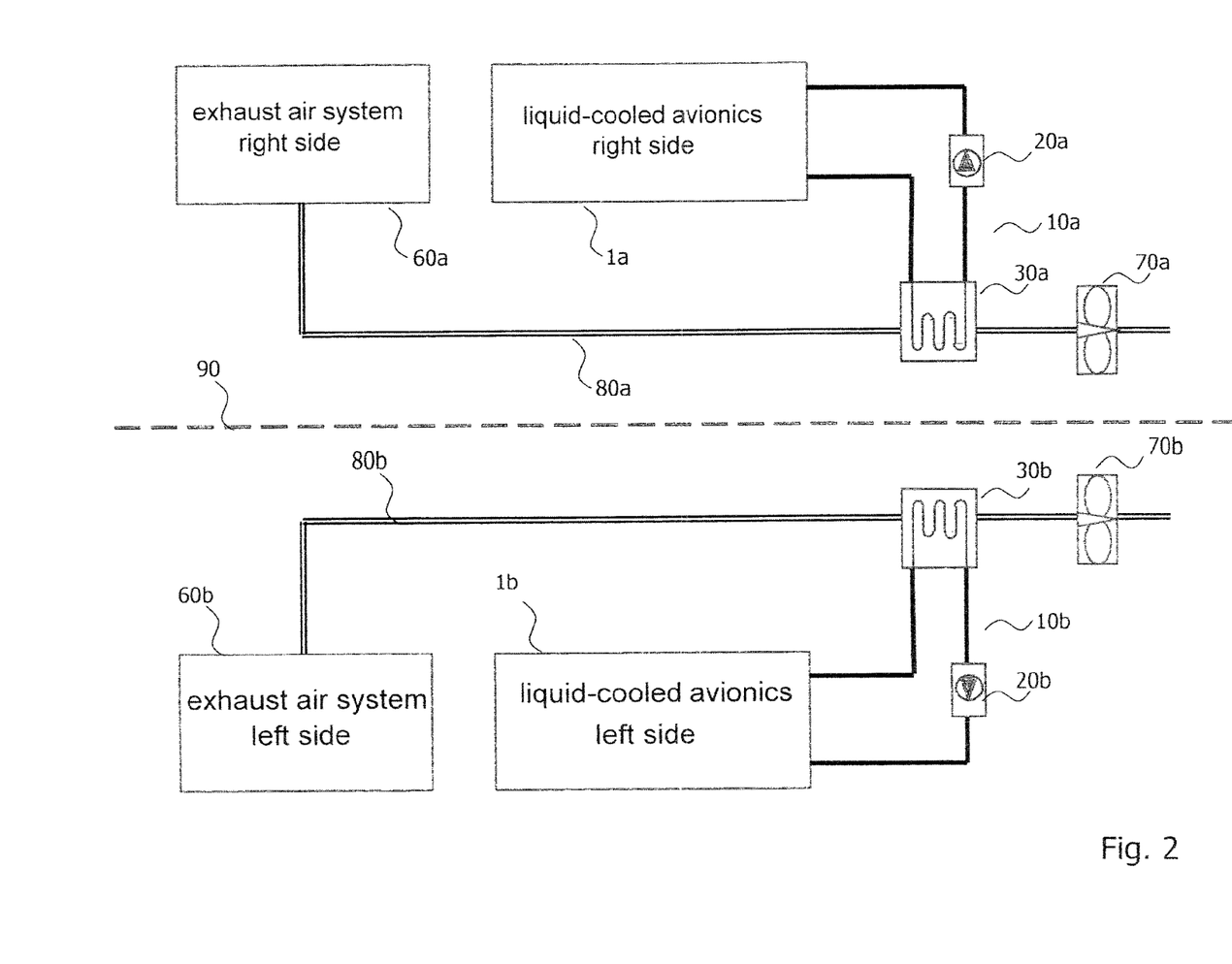
FIG. 2 shows a schematic illustration of a cooling system according to a second embodiment of the present invention with two liquid circuits.

FIG. 2 shows a cooling system according to a second embodiment. As can be seen in FIG. 2, the cooling system shown there contains two partial cooling systems arranged symmetrically to one another with respect to the centre plane 90 of the aircraft. The centre plane 90 runs through the longitudinal axis of the aircraft, is situated perpendicularly to the horizontal and divides the aircraft into two approximately equal-size halves, namely the right side in the direction of flight of the aircraft and the left side in the direction of flight of the aircraft. In all the embodiments, by way of example, the direction of flight is from right to left in the figures, which means that the upper half illustrates in each of the figures the right side of the aircraft and the lower half illustrates in each of the figures the left side of the aircraft. Both partial cooling systems, i.e. the partial cooling system of the right side and the partial cooling system of the left side, may be constructed in the same manner as the cooling system according to the first embodiment from FIG. 1. The latter is the case in the second embodiment from FIG. 2. The first partial cooling system (the right partial cooling system) has a first liquid cooling circuit 10a and a first heat exchanger 30a arranged in the first liquid circuit 10a. Circulating in the first liquid circuit 10a is a cooling liquid which is pumped by a pump 20a to the avionics 1a, absorbs heat there from the avionics 1a, flows to the heat exchanger 30a and dissipates heat there to the heat exchanger 30a. A first pipe arrangement 80a leads from a first exhaust air system 60a to the heat exchanger 30a. A first fan 70a extracts exhaust air from the first exhaust air system 60a and sucks this air through the heat exchanger 30a. The exhaust air sucked through the heat exchanger 30a supports the heat exchanger 30a in the recooling of the cooling liquid.

The partial cooling system of the left side is constructed in the same manner as the partial cooling system of the right side, which has just been described, so that a precise description is dispensed with. The second partial cooling system is symmetrical to the first partial cooling system. Symmetrical here does not necessarily mean that all the components correspond exactly, but that at least a same kind of arrangement of the components exists. The components of the second partial cooling system may be components of the same kind as in the first partial cooling system, but do not have to be. For example, the exhaust air systems 60a, 60b and/or the heat exchangers 30a, 30b and/or other components may be components of different types. Through the mirroring of the partial cooling system on two sides of the aircraft, the availability of the cooling system is still further increased. The liquid cooling shown in FIG. 2 has a smaller space requirement than a corresponding air cooling and is not as complex, as heavy and as large, for the same reliability and availability.

Figure 3:
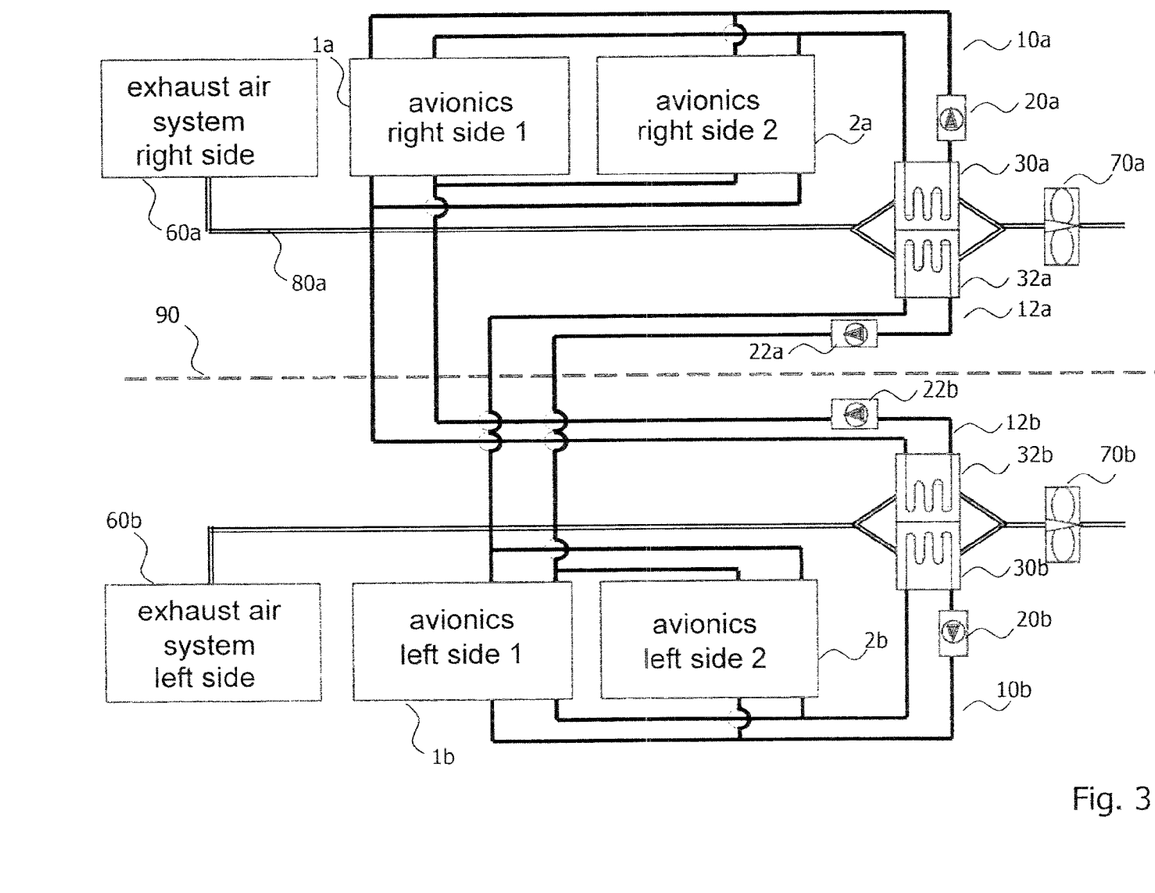
FIG. 3 shows a schematic illustration of a cooling system according to a third embodiment of the present invention with a multiplicity of liquid circuits.
Figure 4:
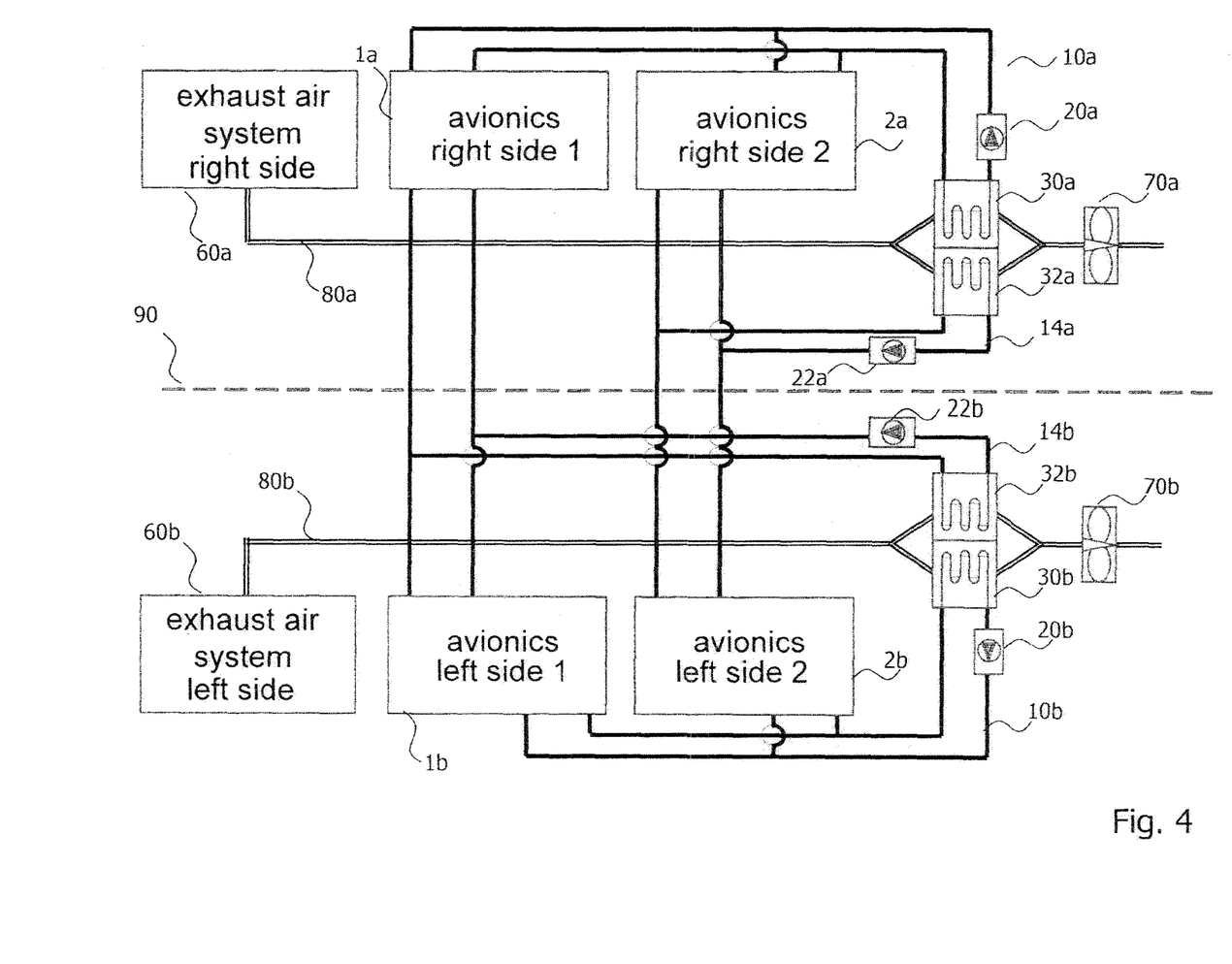
FIG. 4 shows a schematic illustration of a cooling system according to a fourth embodiment of the present invention with a multiplicity of liquid circuits.

FIGS. 3 and 4 show a third and fourth embodiment, by which double redundancy can be achieved. With regard to both embodiments, quite specific assignments are established between liquid circuits, heat exchangers and avionics, which are to be understood as being purely by way of example. This means that other, not explicitly shown assignments are also possible, and are also covered by these embodiments.

As can be seen from FIG. 3, the cooling system according to the third embodiment from FIG. 3 has four liquid circuits 10a, 12a, 10b, 12b which are independent of and separated from one another, of which two liquid circuits 10a, 12a are arranged in the partial cooling system of the right side of the aircraft and two liquid circuits 10b, 12b are arranged in the partial cooling system of the left side of the aircraft. The number of four liquid circuits is to be understood as being purely by way of example both in the third and the fourth embodiment, i.e. any conceivable number of liquid circuits may be arranged on the right and/or the left side of the centre plane. The mirror inversion or symmetry is also to be understood as being purely by way of example, i.e. a different number of liquid circuits, heat exchangers and avionics to be cooled may be arranged on the right side than on the left side. Likewise, purely by way of example, four parts (two on each side) of the avionics are arranged in FIGS. 3 and 4, which are referred to below as avionics parts 1a, 2a, 1b, 2b. Each of the four avionics parts 1a, 2a, 1b, 2b illustrated here is in this case supplied by two different liquid circuits. This applies both to the third embodiment from FIG. 3 and to the fourth embodiment from FIG. 4.

Each of the liquid circuits 10a, 12a, 10b 12b (the same applies to the liquid circuits 10a, 14a, 10b, 14b from FIG. 4) may be flexibly designed. For example, each of the liquid circuits 10a, 12a, 10b, 12b may be designed with the full thermal capacity for hot days. However, for weight optimisation, the architecture shown also enables adaptation of the capacity of the liquid circuits 10a, 12a, 10b, 12b such that the necessary cooling capacity (possibly on failure of another liquid circuit) is achieved only during flight. Irrespective of the precise design of the liquid circuits 10a, 12a, 10b, 12b, in the embodiment according to FIG. 3, the liquid circuit 10a has its heat sink (the assigned heat exchanger 30a) on the right side and supplies the avionics of the right side, namely the avionics parts 1a, 2a. The circuit 12a has its heat sink (the assigned heat exchanger 32a) on the right side and supplies the avionics on the left side, namely the avionics parts 1b, 2b. The liquid circuit 10b is the equivalent of the left side to the liquid circuit 10a, heat source (avionics) and heat sink (heat exchanger) each being exactly mirrored. The same applies to the liquid circuits 12b of the left side and 12a of the right side. This means that the liquid circuit 10b of the left side has its heat sink (the assigned heat exchanger 30b) on the left side and supplies the avionics of the left side, namely the avionics parts 1b, 2b. The liquid circuit 12b has its heat sink (the assigned heat exchanger 32b) on the left side and supplies the avionics of the right side, namely the avionics parts 1a, 2a.

The liquid cooling architecture shown in FIG. 3 has the special attribute that the cooling consumers (e.g. avionics computers) may be altered in their arrangement in a simple manner without influencing the system installations and performance. Likewise, the division of the cooling circuits may be altered in a simple manner, which is shown in FIG. 4.

In contrast to the third embodiment from FIG. 3, in the fourth embodiment from FIG. 4, by way of example, a different assignment of the liquid circuits 10a, 14a, 10b, 14b, heat exchangers 30a, 32a, 30b, 32b and avionics 1a, 2a, 1b, 2b to be cooled is chosen. As can be seen, the liquid circuits 10a and 10b from FIGS. 3 and 4 are identical. Differences exist in the liquid circuits 14a, 14b from FIG. 4 and the liquid circuits 12a, 12b from FIG. 3. The two liquid circuits 14a, 14b divide the avionics not according to left and right, as in FIG. 3, but according to a different criterion. In the fourth embodiment, by way of example, a front/rear division is illustrated, i.e. the cooling circuit 14a supplies the rear avionics parts 2a, 2b and the cooling circuit 14b supplies the front avionics parts 1a, 1b. However, the criterion for division may be freely chosen and combined and the left/right division from FIG. 3 and front/rear division from FIG. 4 are to be understood as being purely by way of example. This ensures a high degree of flexibility in terms of the spatial distribution of the avionics functionality. Likewise, it is conceivable to supply avionics parts of lower availability requirements only with a single liquid circuit. For example, the avionics part 1a could be supplied only by the liquid circuit 10a. This enables a reduction of the circuit(s) which have less waste heat to remove and hence a reduction of the system mass. By contrast, other avionics parts could be supplied with more than two cooling circuits.

No differences exist in the third and the fourth embodiment in the assignment of the exhaust air systems to the heat exchangers. In both embodiments, a fan 70a arranged on the right side sucks exhaust air, via a pipe arrangement 80a, out of the exhaust air system 60a of the right side, which then flows through the two heat exchangers 30a, 32a arranged on the right side. Likewise, a fan 70b arranged on the left side sucks exhaust air, via a pipe arrangement 80b, out of the exhaust air system 60b of the left side, which then flows through the two heat exchangers 30b, 32b arranged on the left side. This arrangement and assignment is also flexibly variable.

Figure 5:
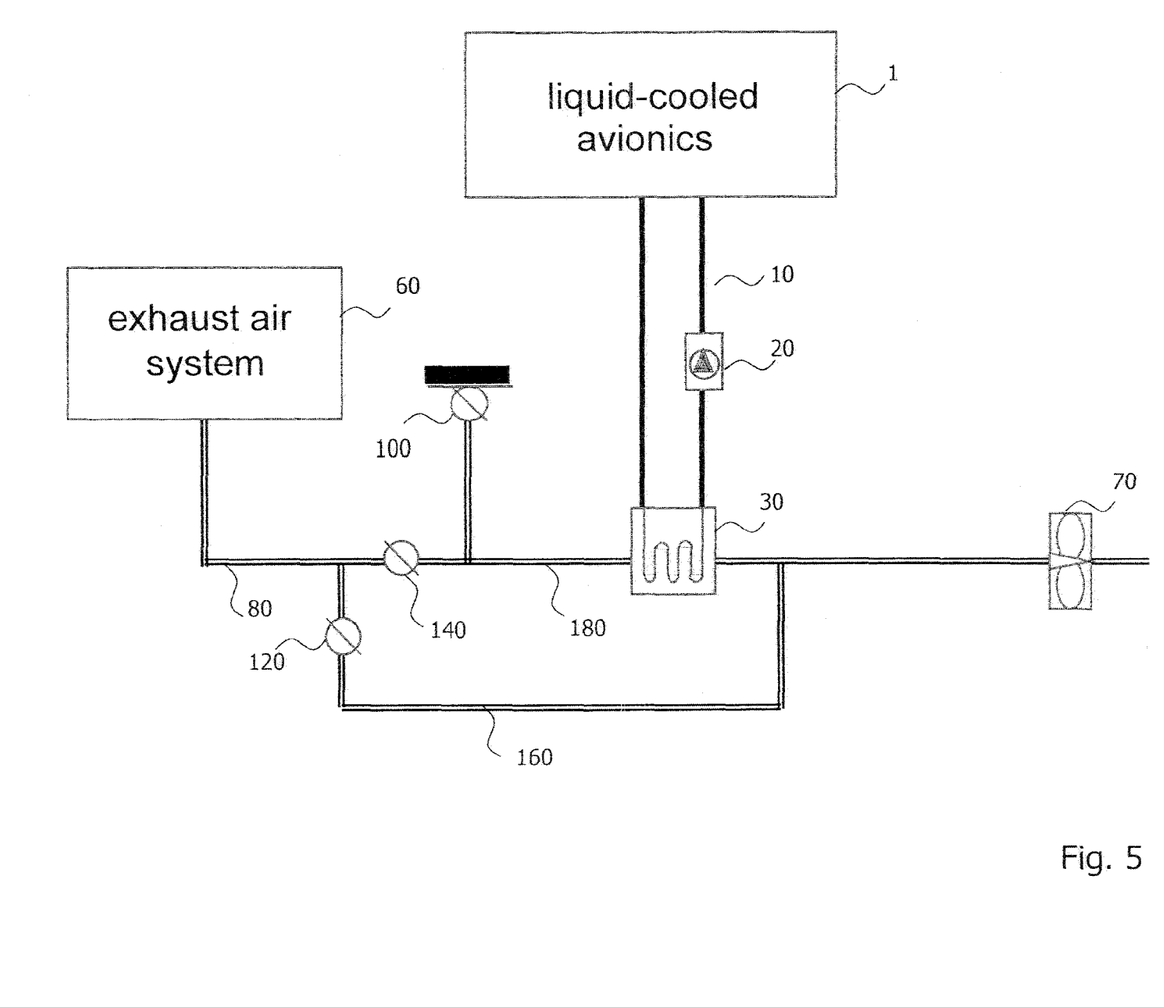
FIG. 5 shows a schematic illustration of a cooling system according to a fifth embodiment of the present invention with one liquid circuit.

In FIG. 5, a cooling system according to a fifth embodiment is illustrated, it being possible for this system to be employed in each of the partial cooling systems of the second, third and fourth embodiment. The cooling system according to the fifth embodiment has a skin valve 100, via which the heat exchanger 30 can be supplied with outside air from outside the aircraft. The skin valve 100 may be selectively opened to allow outside air to enter the pipe arrangement 180 and reach the heat exchanger 30 or may be closed to prevent the entry of the outside air. In order to ensure that no mixing with the sucked-in exhaust air from the exhaust air system 60 occurs and both the pipe arrangement (the run) 80 and the pipe arrangement (the run 180) carry the desired mass flow, isolating valves 120, 140 are provided in both runs. These isolating valves 120, 140 may also be replaced by an individual three-way valve, through which the reliability can be further increased and the mass reduced. It is also possible to replace the isolating valve 140 by a throttle or a shut-off valve, thus minimising mixing on suitable calibration of the pressure losses in the individual runs.

In normal operation, exhaust air is sucked out of the exhaust air system 60 through the heat exchanger 30, as described with reference to the other embodiments, with the aid of the fan 70. In this case, the skin valve 100 is closed, the isolating valve 140 opened and the isolating valve 120 closed. If the cooling liquid in the heat exchanger 30 is to be cooled even more intensely, the skin valve 100 as well as the isolating valve 120 is opened and the isolating valve 140 closed. The fan 70 remains active and thereby sucks the exhaust air out of the exhaust air system 60 through the pipe arrangement 80 and the bypass arrangement 160 past the heat exchanger 30, so that the exhaust air does not contribute to the cooling of the cooling liquid. By contrast, the outside air is sucked through the pipe arrangement 180 through the heat exchanger 30 and thus contributes to the recooling of the cooling liquid. After sufficient recooling of the cooling liquid, the valves 100, 120, 140 can be brought into their initial state again.

Figure 6:
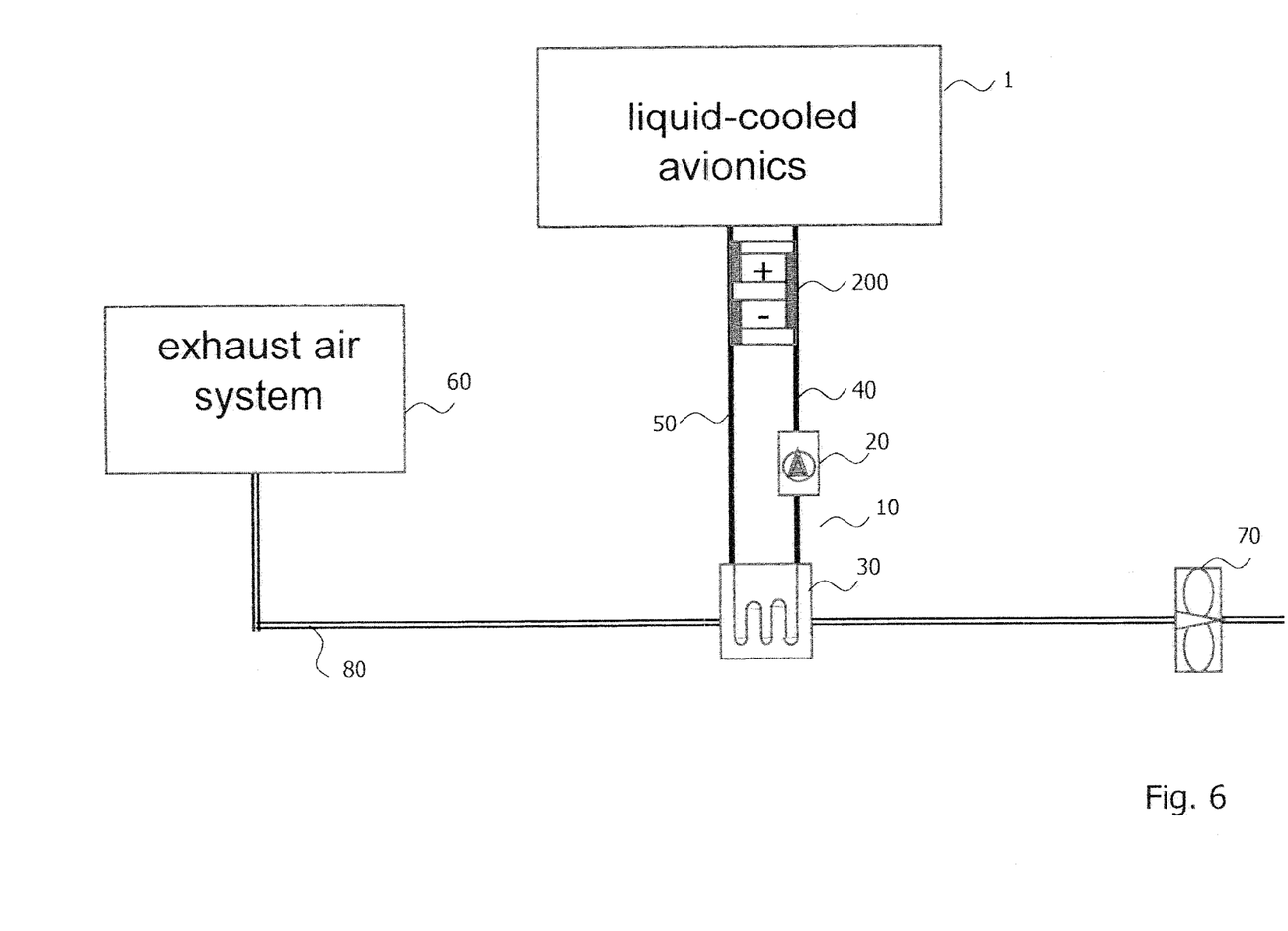
FIG. 6 shows a schematic illustration of a cooling system according to a sixth embodiment of the present invention with one liquid circuit.

In FIG. 6, a sixth embodiment of the cooling system is shown, which system can likewise be combined with each of the partial cooling systems from FIGS. 2 to 4 and with the cooling system from FIG. 5. In order to reduce the temperature level with which the avionics 1 are supplied, a thermoelectric cooling element 200 is inserted in this cooling system according to the sixth embodiment between inflow and outflow 40, 50. This element has its cold side in the inflow 40, and its hot side in the outflow 50. In this case, the heat removed in the inflow 40 is added to the outflow 50. The losses in the cooling element 200 are optionally added to this as well, so that the heat exchanger 30 is designed for a higher heat transformation and an increased liquid temperature input level. The architecture shown gives high flexibility insofar as some parts of the cooling system can be upgraded with thermoelectric cooling and some not. For example, specifically the avionics functionalities necessary for the operation of a heated-up aircraft can be toughened against an elevated (excessive) temperature level. The remaining functionalities can be started up as soon as the fuselage has been sufficiently cooled down by the air conditioning system.

The invention claimed is:

1. A cooling system for cooling at least one first heat producing device provided on-board a means of transport, the cooling system comprising:
   at least one first liquid circuit,
   at least one first heat exchanger assigned to the first liquid circuit,
   the first liquid circuit, for cooling the at least one first heat producing device provided on board the means of transport, being configured to absorb heat of the first heat producing device by a cooling liquid circulating in the first liquid circuit and dissipate heat to the first heat exchanger, and
   one of a first fan and a first pressure regulating valve assigned to the first liquid circuit, the one of the first fan and the first pressure regulating valve being configured to extract first exhaust air by sucking the exhaust air, via a first pipe arrangement, out of a first exhaust air system available on board the means of transport, the extracted first exhaust air flowing through the first heat exchanger in order to recool the cooling liquid, and
   the cooling system further comprising:
   at least one second liquid circuit,
   at least one second heat exchanger assigned to the second liquid circuit,
   the second liquid circuit, for cooling at least one second heat producing device provided on board the means of transport, being configured to absorb heat of the second heat producing device by a cooling liquid circulating in the second liquid circuit and dissipate heat to the second heat exchanger, and
   one of a second fan and a second pressure regulating valve assigned to the second liquid circuit, the one of the second fan and the second pressure regulating valve being configured to extract second exhaust air by sucking the exhaust air, via a second pipe arrangement, out of a second exhaust air system available on board the means of transport, the extracted second exhaust air flowing through the second heat exchanger in order to retool the cooling liquid.

2. The cooling system according to claim 1, the at least one first heat exchanger being arranged in a first region of the means of transport and/or the at least one second heat exchanger being arranged in a second region separated from the first region.

3. The cooling system according to claim 2, the first region comprising a first side of a centre plane running through a longitudinal axis of the means of transport and/or the second region comprising a second side of the centre plane running through the longitudinal axis of the means of transport.

4. The cooling system according to claim 2, at least one of the at least one first liquid circuit, for cooling at least one of the at least one first heat producing device, extending at least partially in the first region and/or at least one of the at least one second liquid circuit, for cooling at least one of the at least one second heat producing device, extending at least partially in the second region.

5. The cooling system according to claim 2, at least one of the at least one first liquid circuit, for cooling at least one of the at least one second heat producing device, extending at least partially in the second region and/or at least one of the at least one second liquid circuit, for cooling at least one of the at least one first heat producing device, extending at least partially in the first region.

6. The cooling system according to claim 2, at least one of the at least one first liquid circuit, for cooling all of the at least one first heat producing device, extending at least partially in the first region and/or at least one of the at least one second liquid circuit, for cooling all of the at least one second heat producing device, extending at least partially in the second region.

7. The cooling system according to claim 2, at least one of the at least one first liquid circuit, for cooling at least one of the at least one first heat producing device, extending at least partially in the first region and, for cooling at least one of the at least one second heat producing device, extending at least partially in the second region and/or at least one of the at least one second liquid circuit, for cooling at least one of the at least one first heat producing device, extending at least partially in the first region and, for cooling at least one of the at least one second heat producing device, extending at least partially in the second region.

8. Cooling system according to claim 1, the cooling system further comprising one or more fans and/or one or more pressure regulating valves which are each arranged in such a manner in the cooling system and so configured as to extract the exhaust air from the first air-guiding system, for example the first exhaust air system, and/or the second air-guiding system, for example the second exhaust air system, and also one or more pipe arrangements which are each configured to supply the extracted exhaust air to the first and/or the second heat exchanger in order to recool the cooling liquid.

9. Cooling system according to claim 1, the cooling system being so configured that outside air surrounding the means of transport and/or inside air present inside the means of transport and surrounding the cooling system can be supplied to the first and/or the second heat exchanger in order to cool the cooling liquid, and the exhaust air extracted from the first air-guiding system, for example the first exhaust air system, and/or the second air-guiding system, for example the second exhaust air system, can be guided past the first and/or second heat exchanger via one or more bypass arrangements.

10. Cooling system according to claim 9, the cooling system further comprising a valve arrangement and/or a pipe stop arrangement which is configured to isolate the supplied outside air and/or the supplied inside air from the exhaust air guided via the bypass arrangement.

11. Cooling system according to claim 1, the cooling system further comprising one or more thermoelectric cooling elements which are each arranged in such a manner in the first and/or in the second liquid circuit and so configured that the one or more thermoelectric cooling elements absorb heat from the cooling liquid in the inflow of the first and/or of the second liquid circuit and dissipate heat to the cooling liquid in the outflow of the first and/or of the second liquid circuit.

12. Use of the cooling system according to claim 1 for cooling at least one first heat producing device provided in a means of transport, for example in an aircraft.

13. Means of transport, for example aircraft, comprising the cooling system according to claim 1.

* * * * *